(12) United States Patent
Kutzscher

(10) Patent No.: US 8,511,156 B2
(45) Date of Patent: Aug. 20, 2013

(54) TIRE PRESSURE SENSING MOUNTING SYSTEM

(75) Inventor: Michael Kutzscher, Port Sydney (CA)

(73) Assignee: 1814393 Ontario Inc., Hamilton (CA)

( * ) Notice: Subject to any disclaimer, the term of this patent is extended or adjusted under 35 U.S.C. 154(b) by 8 days.

(21) Appl. No.: 13/370,404

(22) Filed: Feb. 10, 2012

(65) Prior Publication Data
US 2012/0204635 A1 Aug. 16, 2012

Related U.S. Application Data

(60) Provisional application No. 61/443,277, filed on Feb. 16, 2011.

(51) Int. Cl.
*G01M 17/02* (2006.01)
*B60C 23/00* (2006.01)

(52) U.S. Cl.
USPC .......................... 73/146; 152/152; 152/152.1

(58) Field of Classification Search
USPC ................................................ 73/146–146.8
See application file for complete search history.

(56) References Cited

U.S. PATENT DOCUMENTS

| | | | |
|---|---|---|---|
| 6,025,777 A | 2/2000 | Fuller et al. | |
| 6,292,095 B1 | 9/2001 | Fuller et al. | |
| 6,444,069 B1 | 9/2002 | Koch et al. | |
| 6,462,650 B1 | 10/2002 | Balzer et al. | |
| 6,469,638 B1 | 10/2002 | Johnson | |
| 6,486,771 B1 | 11/2002 | Fuller et al. | |
| 6,546,982 B1 * | 4/2003 | Brown et al. | 152/152.1 |
| 6,624,748 B1 | 9/2003 | Phelan et al. | |
| 6,630,885 B2 | 10/2003 | Hardman et al. | |
| 6,782,741 B2 | 8/2004 | Imbert | |
| 6,860,303 B2 * | 3/2005 | Rensel et al. | 152/152.1 |
| 6,885,291 B1 * | 4/2005 | Pollack et al. | 340/445 |
| 6,899,153 B1 * | 5/2005 | Pollack et al. | 152/152.1 |
| 7,075,421 B1 | 7/2006 | Tuttle | |
| 7,204,136 B2 * | 4/2007 | Thrush et al. | 73/146.2 |
| 7,246,518 B2 | 7/2007 | Ito et al. | |
| 7,328,608 B2 | 2/2008 | Kashiwai et al. | |
| 7,733,241 B2 | 6/2010 | Haswell et al. | |
| 2002/0046791 A1 * | 4/2002 | Rensel et al. | 152/151 |
| 2003/0156024 A1 * | 8/2003 | Beckley | 340/447 |
| 2005/0076982 A1 * | 4/2005 | Metcalf et al. | 152/152.1 |
| 2006/0130571 A1 * | 6/2006 | Thrush et al. | 73/146.2 |
| 2006/0158340 A1 * | 7/2006 | Wilson et al. | 340/693.12 |

(Continued)

FOREIGN PATENT DOCUMENTS
CN 201069379 6/2008

*Primary Examiner* — Andre Allen
(74) *Attorney, Agent, or Firm* — Harness, Dickey & Pierce, P.L.C.

(57) ABSTRACT

A tire pressure sensing system includes a tire patch having first and second faces. A plate fixed to the second face is oriented perpendicular to a tire patch longitudinal axis. A sensor mount is positioned on the first face and oppositely facing with respect to the plate. The sensor mount includes opposed first and second bias clips and is oriented perpendicular to the tire patch longitudinal axis. At least one plate fastener extends through the tire patch fixes the plate to the second face and the sensor mount to the first face. A tire pressure sensor is releasably retained by first and second sensor fasteners and the first and second bias clips to the sensor mount. The tire pressure sensor is oriented perpendicular to the longitudinal axis. The tire patch is permanently connected to a tire inner tread wall having the longitudinal axis coaxially aligned with a tire radial centerline.

20 Claims, 6 Drawing Sheets

(56) References Cited

U.S. PATENT DOCUMENTS

| | | |
|---|---|---|
| 2006/0220812 A1 | 10/2006 | Luce |
| 2006/0237109 A1 | 10/2006 | Mangold et al. |
| 2007/0175554 A1* | 8/2007 | Bertrand .................... 152/152.1 |
| 2008/0289407 A1* | 11/2008 | Gramling et al. ............ 73/146.5 |
| 2009/0058667 A1* | 3/2009 | Dixon et al. .................. 340/626 |
| 2009/0167518 A1* | 7/2009 | Koch ............................ 340/447 |
| 2010/0007477 A1 | 1/2010 | Wilson et al. |
| 2011/0119901 A1* | 5/2011 | Shimura ......................... 29/600 |
| 2011/0132649 A1* | 6/2011 | Weston et al. ................ 174/260 |
| 2012/0176762 A1* | 7/2012 | Hotaling et al. ............. 361/807 |

* cited by examiner

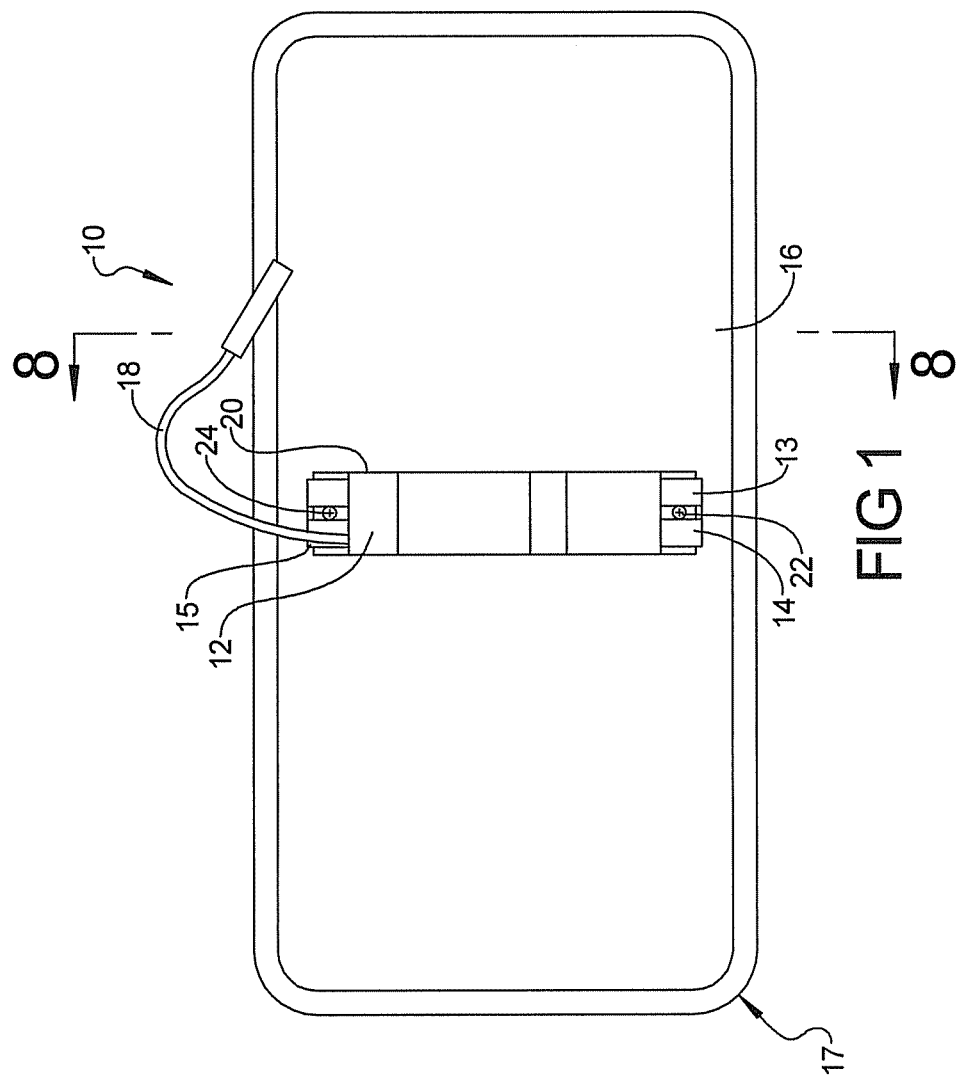

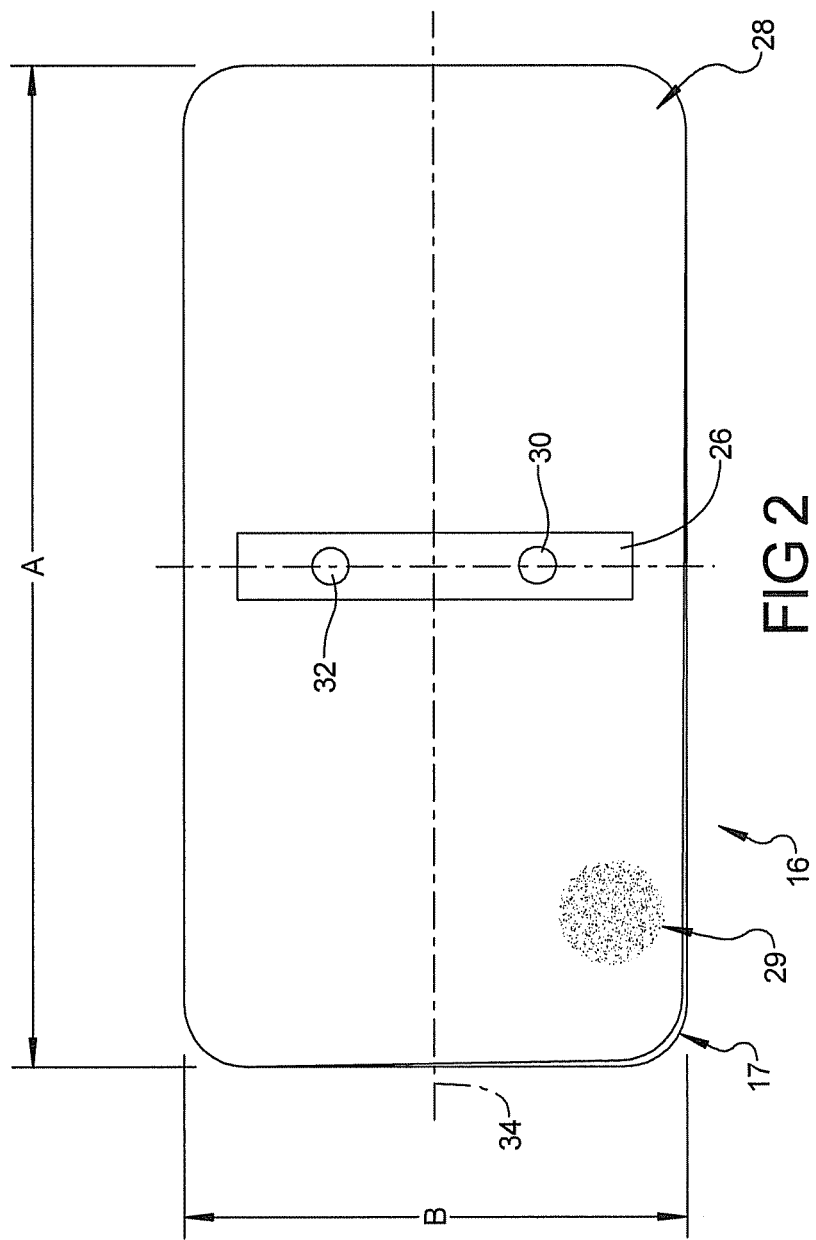

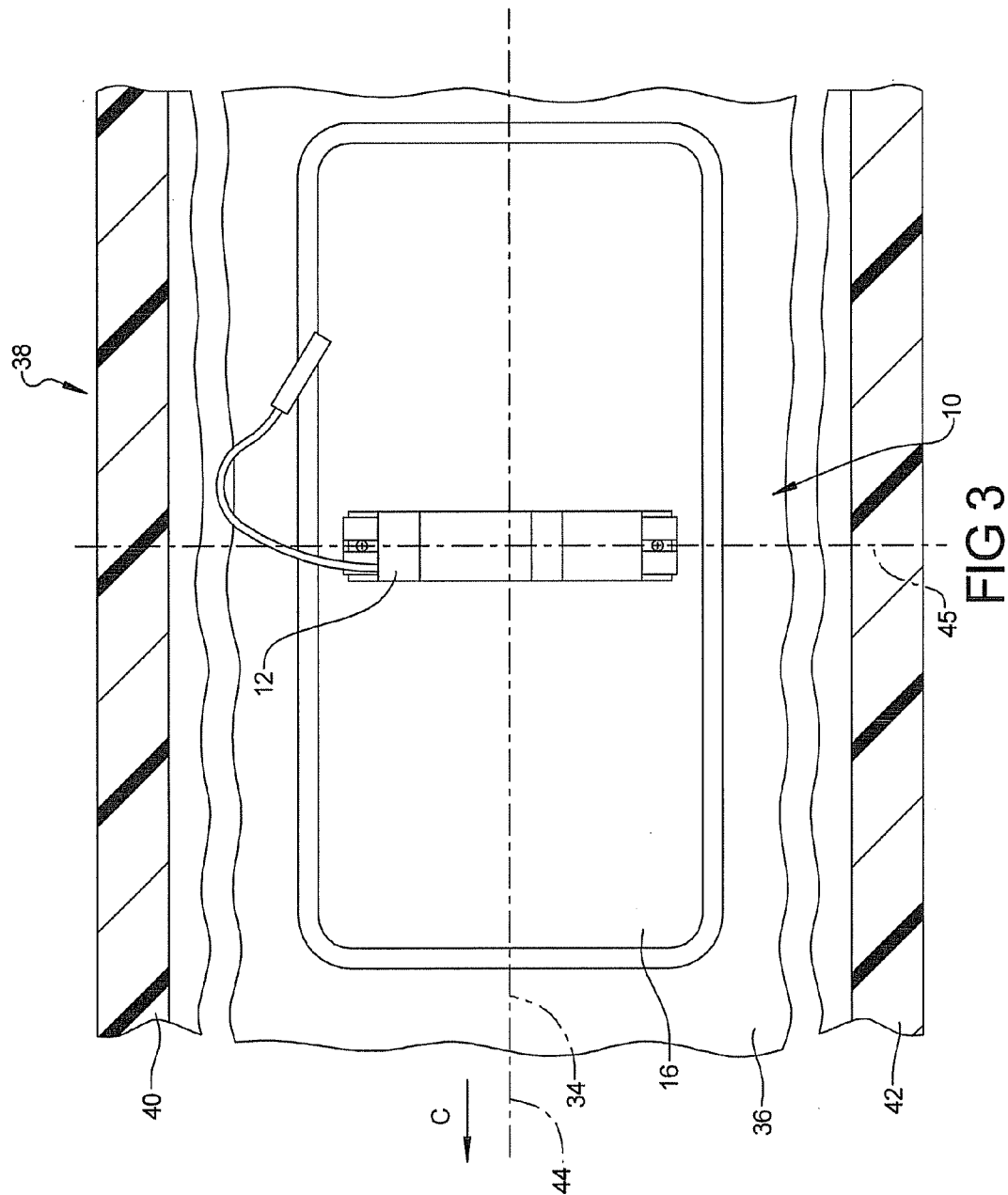

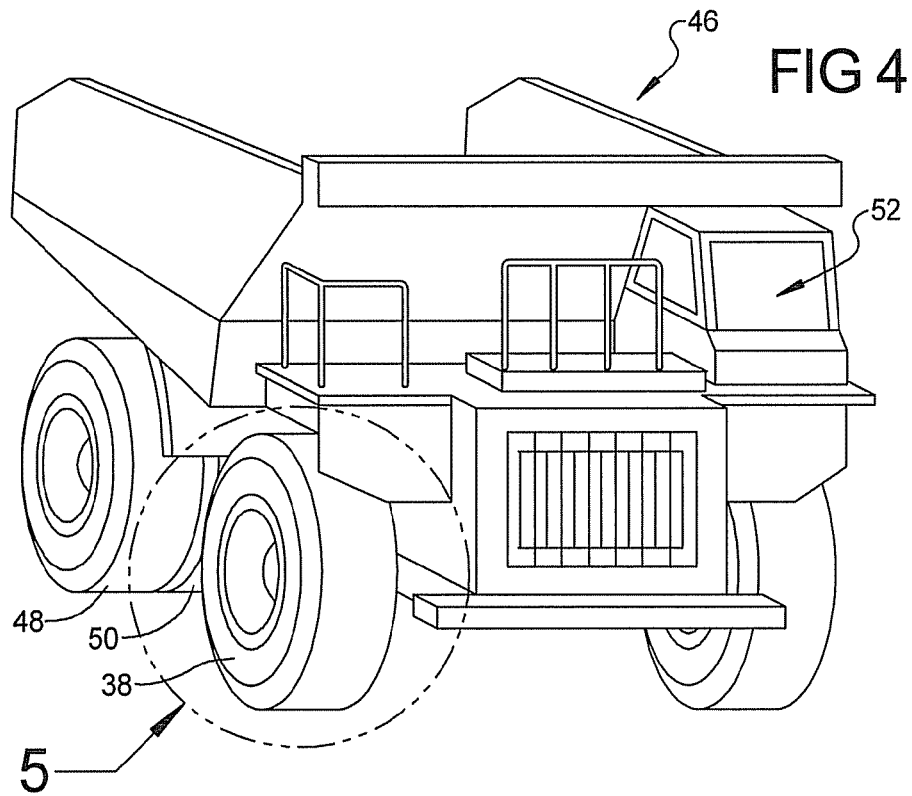
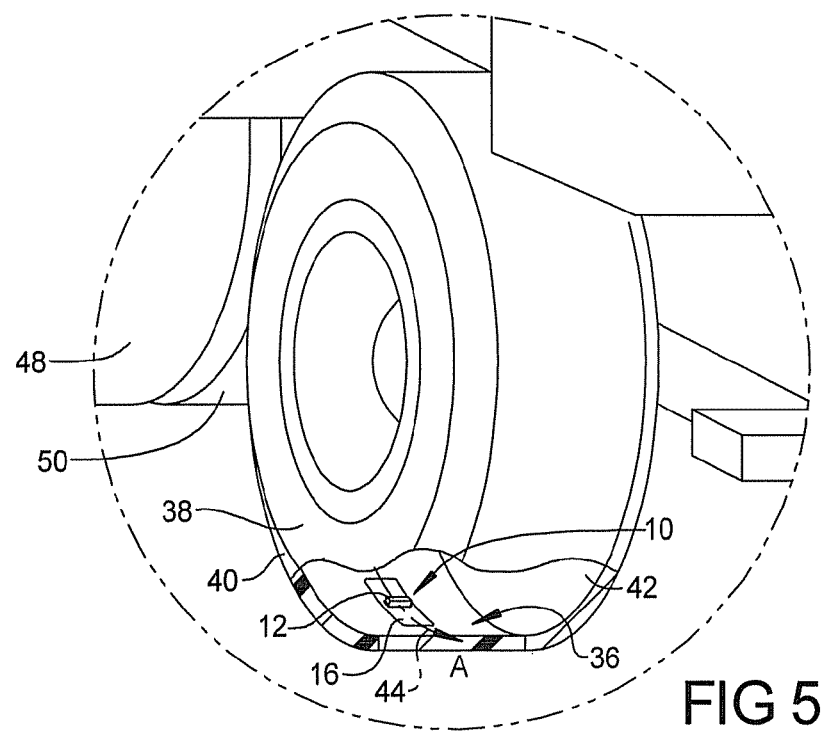

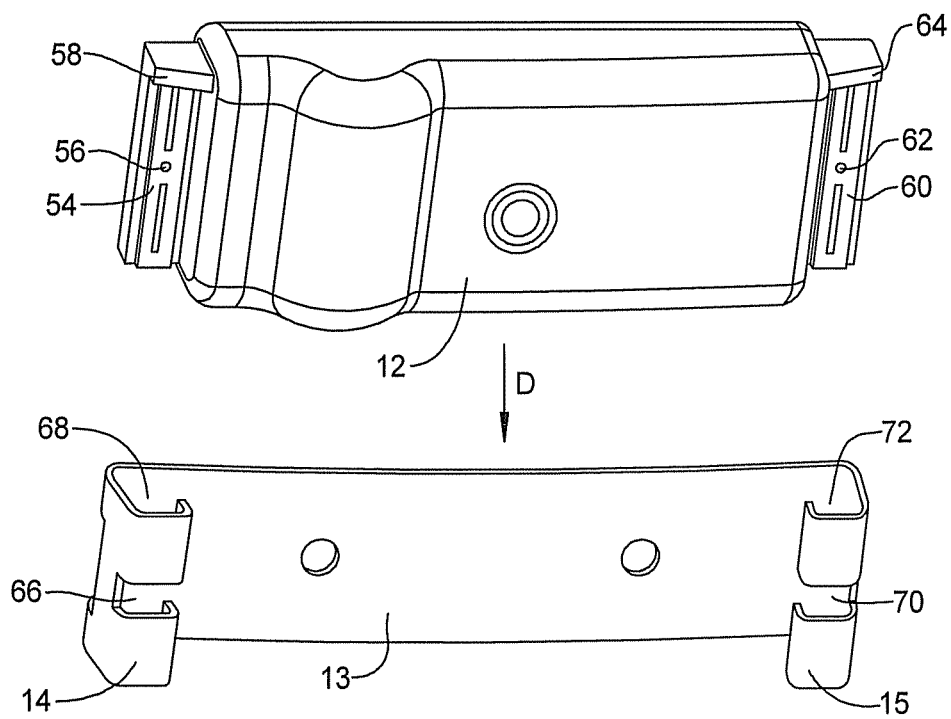
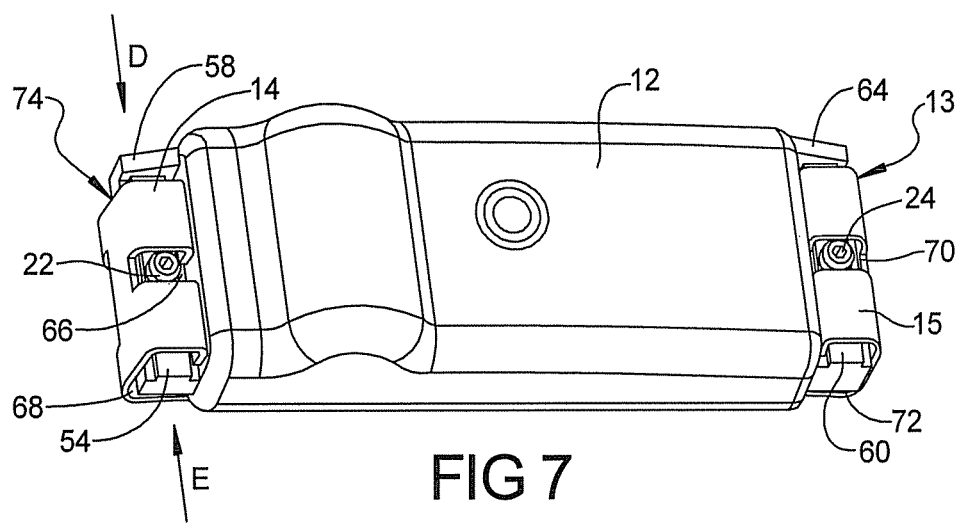
FIG 6
FIG 7

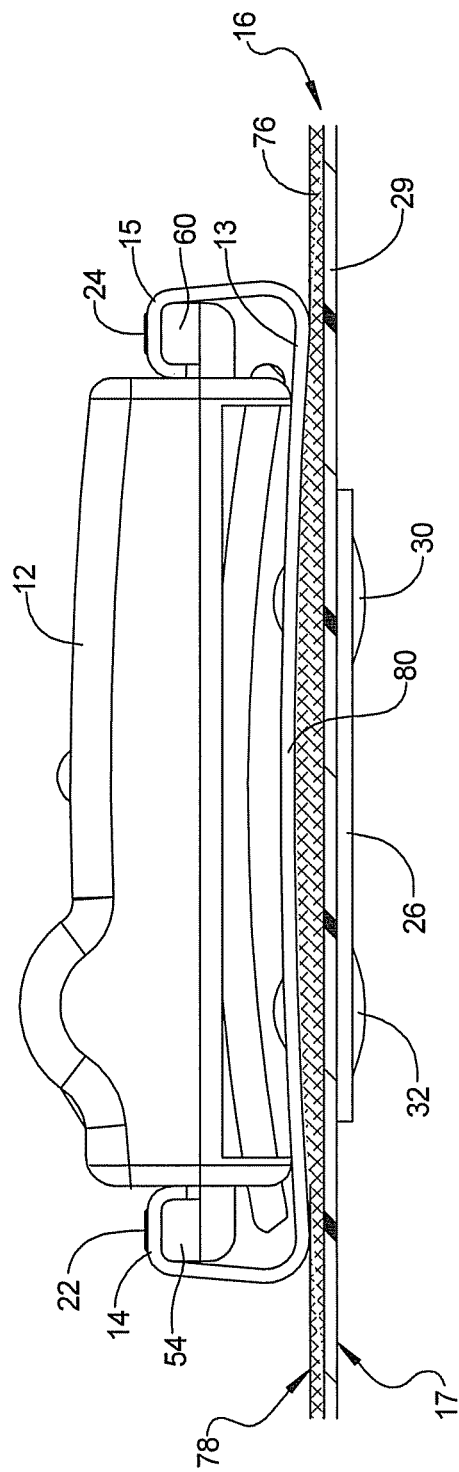

TIRE PRESSURE SENSING MOUNTING SYSTEM

CROSS-REFERENCE TO RELATED APPLICATION

This application claims the benefit of U.S. Provisional Application No. 61/443,277, filed on Feb. 16, 2011. The entire disclosure of the above application is incorporated herein by reference.

FIELD

The present disclosure relates to tire pressure sensing devices positioned within a vehicle tire.

BACKGROUND

This section provides background information related to the present disclosure which is not necessarily prior art.

Tires used on large earth moving, mining, farming, and heavy load bearing vehicles are commonly mechanically pressed onto the rims and locked on using a mechanically fastened ring assembly. This differs significantly from the mounting utilized commonly on automotive and commercial over-the-road vehicle tires that utilize a one-piece rim with a center recess, allowing the tire to be mounted by rolling the tire onto the rim. The same procedure applies to both radial and bias ply tires. For this reason, tire pressure sensors which wirelessly send out tire pressure signals cannot be mounted on the wheel proximate to the tire interface, and are therefore positioned within the tire and are commonly mounted by fixing the sensor using a mounting pad with both the sensor and mounting pad vulcanized, adhesively bonded, or otherwise fixed to the inner wall of the tire. When a tire pressure sensor fails, the entire sensor and its connection pad must be ground off before a new sensor can be installed. When the tire requires retreading, the tire pressure sensor would be damaged by the high temperatures required during the vulcanizing process, and therefore an otherwise functioning tire pressure sensor and its mounting pad must be ground off and a new sensor installed following the retreading process. In both instances significant cost and time are required to remove and replace the tire pressure sensor.

SUMMARY

This section provides a general summary of the disclosure, and is not a comprehensive disclosure of its full scope or all of its features.

According to several embodiments, a tire pressure sensing system includes a tire patch having first and second faces. A plate fixed to the second face is oriented perpendicular to a tire patch longitudinal axis. A sensor mount is positioned on the first face and oppositely facing with respect to the plate. The sensor mount includes opposed first and second bias clips and is oriented perpendicular to the tire patch longitudinal axis. At least one plate fastener extends through the tire patch fixes the plate to the second face and the sensor mount to the first face. A tire pressure sensor is releasably retained by first and second sensor fasteners and the first and second bias clips to the sensor mount. The tire pressure sensor is oriented perpendicular to the longitudinal axis. The tire patch is permanently connected to a tire inner tread wall having the longitudinal axis coaxially aligned with a tire radial centerline.

According to other embodiments, the first sensor fastener extends through the sensor mount proximate to the first bias clip and releasably engages the tire pressure sensor. The second sensor fastener extends through the sensor mount proximate to the second bias clip and releasably engages the tire pressure sensor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a top perspective view of a tire pressure sensing mounting system of the present disclosure;

FIG. 2 is a bottom perspective view of a tire patch and mounting plate for the system of FIG. 1;

FIG. 3 is a partial cross sectional perspective view of the system of FIG. 1 mounted in a vehicle tire;

FIG. 4 is a front right perspective view of a vehicle having the system of FIG. 1;

FIG. 5 is a partial cross sectional front right perspective view of area 5 of FIG. 4;

FIG. 6 is a top perspective assembly view of the tire pressure sensor and sensor mount prior to engagement of the tire pressure sensor;

FIG. 7 is a top perspective view of the tire pressure sensor and sensor mount following engagement of the tire pressure sensor; and FIG. 8 is a cross sectional end elevational view taken at section 8 of FIG. 1.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, a tire pressure sensing system 10 has an electric signal output tire pressure sensor 12 that is releasably mounted to a sensor mount 13 such as a metal bracket. The sensor mount 13 can include oppositely positioned first and second bias clip members 14, 15 that define bent or hooked members that elastically deflect to receive and are thereafter biased to releasably retain the tire pressure sensor 12. The sensor mount 13 is fixed to a tire patch 16 through a first face 17 of tire patch 16 as will be described in reference to FIG. 2. According to several embodiments, a signal transmission antenna 18 can extend outwardly from tire pressure sensor 12 (shown), or can be incorporated within an enclosure housing 20 of tire pressure sensor 12. Tire pressure sensor 12 is further releasably connected to sensor mount 13 using oppositely positioned first and second fasteners 22, 24, which when removed permit lateral sliding release of tire pressure sensor 12 away from the first and second bias clip members 14, 15.

Referring to FIG. 2 and again to FIG. 1, tire patch 16 is shown prior to installation of sensor mount 13. A plate 26 is fixed to tire patch 16 such as by adhesive bonding or using a vulcanizing process. Plate 26 can be made of a metal such as steel or aluminum. Plate 26 is fixed to a bonding second face 28 of tire patch 16 to which an adhesive or bonding material 29 is also applied to cover substantially all of second face 28 prior to installation of plate 26. Bonding material 29 such as an adhesive can be applied to second face 28 during manufacture of tire patch 16, or applied at the time of installation of tire patch 16. At least one and according to several embodiments first and second plate fasteners 30, 32 such as large head rivets extend through the plate 26 and are equally spaced with respect to a longitudinal axis 34 of tire patch 16 and are centered both radially and diagonally with respect to bonding second face 28. The shanks of first and second plate fasteners 30, 32 extend through plate 26, second face 28 and first face 17 to fix sensor mount 13 to first face 17.

According to several embodiments, plate 26 is oriented perpendicular to longitudinal axis 34 of the tire patch 16 such that tire pressure sensor 12 is also perpendicularly oriented with respect to longitudinal axis 34 when mounted to sensor mount 13. Tire patch 16 has a length "A" which is greater than a width "B" such that longitudinal axis 34 is parallel with respect to tire patch body sides having length "A". Plate 26 can be rectangular in shape such that longer sides of plate 26 are perpendicular to longitudinal axis 34. This maximizes an amount of axial or longitudinal flexure permitted for tire patch 16 parallel to longitudinal axis 34 and length "A" compared to flexure with respect to width "B". According to further embodiments, plate 26 is omitted if testing indicates the head or engagement end of the first and second fasteners 30, 32 are sized to resist pullout of first and second fasteners 30, 32 through tire patch 16 without the reinforcement provided by plate 26. In these embodiments, the head or engagement end of the first and second fasteners 30, 32 directly contact bonding material 29 and/or second face 28. In addition, the attachment of pressure sensor 12 and sensor mount 13 to tire patch 16 is not limited by a fastener design selected, therefore other fastener or attachment designs can be used in addition to rivets, screws or bolts, including but not limited to straps, clips, barbs, staples, adhesives, and the like.

Referring to FIG. 3 and again to FIG. 1, according to several embodiments tire patch 16 is fixed such as permanently adhesively bonded or heat/vulcanized to an inner tread wall 36 of a tire 38 and centrally positioned between tire first and second side walls 40, 42. To minimize the potential for impacting the rotational balance of tire 38, tire patch 16 is also aligned having longitudinal axis 34 of tire patch 16 substantially coaxially aligned with a radial centerline 44 of tire 38. Radial centerline 44 is defined as being equidistantly spaced between first and second side walls 40, 42 along inner tread wall 36. In this position, a body longitudinal axis 45 of tire pressure sensor 12 is oriented perpendicular to radial centerline 44 and is therefore oriented perpendicular to a rotational direction "C" of the tire 38. This orientation centers the mass of tire pressure sensor 12, sensor mount 13 and tire patch 16 in alignment with radial centerline 44 to balance the rotational forces generated by tire pressure sensing system 10. Because tire pressure sensor 12 has a greater length than width, this orientation also minimizes the dimension (width) of tire pressure sensor 12 which is oriented in the rotational direction "C" such that a deflection of inner tread wall 36 from an object in the tire travel path will minimize the potential to dislodge tire pressure sensor 12.

Referring to FIG. 4 and again to FIGS. 1 and 3, tire pressure sensing system 10 can be used for sensing and monitoring tire pressure conditions in any vehicle tire, and particularly in slowly rotating tires 38 such as the front steerable tire or rear tires 48 of a large heavy material hauling machine 46. The wireless transmission signal from tire pressure sensor 12 can be received in a cab 52 of hauling machine 46 and monitored by the occupant of cab 52.

Referring to FIG. 5, an exemplary installation of tire pressure sensing system 10 in tire 38 is shown having tire pressure sensor 12 oriented perpendicular to radial centerline 44 and tire patch 16 centered on inner tread wall 36. This orientation maximizes the spacing between tire pressure sensor 12 and either of the first or second side walls 40, 42. Because tire deflection of the first and second side walls 40, 42 continuously varies during tire rotation and when tire 38 (or 48) encounters an object, this positioning of tire pressure sensor 12 minimizes deflection which could affect the bond at tire patch 16.

Referring to FIG. 6 and again to FIG. 1, tire pressure sensor 12 is shown prior to sliding engagement with sensor mount 13. According to several embodiments, tire pressure sensor 12 includes a first engagement end 54 having an aperture 56 for receiving first fastener 22. A first end wall 58 extends past a raised height of first engagement end 54. Tire pressure sensor 12 further includes a second engagement end 60 having an aperture 62 for receiving second fastener 24. A second end wall 64 defining a mirror image configuration of first end wall 58 extends past a raised height of second engagement end 60.

Sensor mount 13 includes an opening or first gap 66 centrally disposed in first bias clip member 14 having a width selected to permit contact with first bias clip member 14 material on opposite sides of first gap 66 by first fastener 22 when first fastener 22 is received therein. Similarly, an opening or second gap 70 is centrally disposed in second bias clip member 15 having a width selected to permit contact with second bias clip member 15 material on opposite sides of gap 70 by second fastener 24 when second fastener 24 is received in second gap 70. First and second bias clip members 14, 15 are bent or formed to create first and second partial cavities 68, 72 that are sized to slidably receive first and second engagement ends 54, 60 when tire pressure sensor 12 is coupled with sensor mount 13 in a lateral sliding motion in an engagement direction "D".

Referring to FIG. 7, tire pressure sensor 12 is shown after coupling with sensor mount 13. The first and second engagement ends 54, 60 are fully engaged in first and second partial cavities 68, 72 when first and second end walls 58, 64 both contact an edge 74 of sensor mount 13 preventing further sliding motion in the engagement direction "D". When first and second fasteners 22, 24 are subsequently engaged in first and second apertures 56, 62 (not visible in this view) and contact walls of first and second gaps 66, 70 are contacted by first and second fasteners 22, 24, tire pressure sensor 12 is prevented from release in a release direction "E".

Referring to FIG. 8, the adhesive 29 is applied as a second layer of tire patch 16 and defines first face 17. Tire patch 16 can be created from at least one layer 76 of an elastically flexible material such as a rubber or polymeric material that defines a second face 78 of tire patch 16. A body portion 80 of sensor mount 13 is placed in direct contact with second face 78 of tire patch 16 and plate 26 is placed in direct contact with first face 17. First and second plate fasteners 30, 32 are extended through coaxially aligned apertures (not visible in this view) created in both plate 26 and body portion 80 and fixed to retain tire pressure sensor 12 and sensor mount 13 in the installed position shown. According to further aspects, plate 26 can be omitted and the heads of fasteners 30, 32 can directly contact the first face 17 and adhesive 29.

Tire pressure sensing system 10 of the present disclosure offers several advantages. The capability to remove tire pressure sensor 12 permits complete replacement of tire pressure sensor 12, or replacement of a battery (or power supply) of the unit without removal of tire patch 16. The capability to remove tire pressure sensor 12 also permits tires 38 or 48 to be retreaded without requiring removal of tire patch 16. The tire pressure sensor 12 is removed prior to application of the high temperatures required during the vulcanizing and/or bonding process to retread tire 38 or 48. Tire patch 16 can be exposed to retread vulcanizing temperatures, therefore removal of tire patch 16 is not required, unlike other known systems. Tire pressure sensor 12 can therefore be re-used after tire retread, or with a new tire after installation of tire patch 16. The perpendicular orientation of tire pressure sensor 12 with respect to the tire radial centerline 44 minimizes the potential for tire impact causing displacement of tire pressure sensor 12. The axial alignment of longitudinal axis 34 of tire patch 16 with tire radial centerline 44 minimizes the potential for impacting tire balance. The use of fasteners 22, 24 independent of or in addition to the elastic retention capability of first and second bias clip members 14, 15 promotes releasable engagement of tire pressure sensor 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tire pressure sensing system, comprising:
   a tire patch having a first face and an oppositely directed second face;
   a sensor mount positioned on the first face of the tire patch oppositely facing with respect to the second face, the sensor mount including opposed first and second bias clip members;
   a tire pressure sensor releasably retained to the sensor mount by the bias clip members; and
   the tire patch second face is fixed to an inner tread wall of a tire having the longitudinal axis of the tire patch coaxially aligned with a radial centerline of the tire.

2. The tire pressure sensing system of claim 1, wherein:
   the sensor mount clip members are oriented perpendicular with respect to the longitudinal axis of the tire patch and are elastically deflected when releasably engaging the tire pressure sensor; and
   the sensor mount is fixed in direct contact with the first face by at least one fastener extending through the tire patch and the sensor mount.

3. The tire pressure sensing system of claim 2, wherein the at least one fastener includes first and second fasteners each having a fastener head positioned proximate to the second face.

4. The tire pressure sensing system of claim 3, further including:
   a rectangular shaped plate directly fixed to the second face having longer sides oriented perpendicular to a longitudinal axis of the tire patch; and
   the first and second fasteners extending through the tire patch and the plate having the fastener head of each in direct contact with the plate thereby fixing the plate to the second face and the sensor mount to the first face.

5. The tire pressure sensing system of claim 1, wherein the body longitudinal axis of the tire pressure sensor is oriented perpendicular to a tire radial centerline and perpendicular to a rotational direction of the tire centering a mass of the tire pressure sensor on the tire radial centerline, the sensor mount and the tire patch aligned with the radial centerline thereby balancing rotational forces generated by the tire pressure sensing system.

6. The tire pressure sensing system of claim 5, wherein the tire pressure sensor has a length greater than a width, such that the orientation of the tire pressure sensor perpendicular to the tire radial centerline and perpendicular to the rotational direction minimizes a tire pressure sensor width oriented in the rotational direction thereby minimizing a force acting to dislodge the tire pressure sensor from the tire tread wall during deflection of the tread wall.

7. The tire pressure sensing system of claim 1, further including a layer of adhesive applied to the tire patch second face to fix the tire patch to the inner tread wall of the tire and wherein the tire pressure sensor is oriented perpendicular with respect to the longitudinal axis of the tire patch when the tire patch is fixed to the inner tread wall.

8. The tire pressure sensing system of claim 1, further including a first sensor fastener extending through the sensor mount proximate to the first bias clip member, and a second sensor fastener extending through the sensor mount proximate to the second bias clip member, the first and second sensor fasteners releasably fastening the tire pressure sensor to the sensor mount.

9. The tire pressure sensing system of claim 1, wherein the tire patch has a length which is greater than a width and wherein the longitudinal axis is parallel to sides of the tire patch having a side length equal to the tire patch length.

10. The tire pressure sensing system of claim 1, further including first and second plate fasteners extending through the tire patch and the sensor mount, wherein the first and second plate fasteners are equally spaced with respect to the longitudinal axis of the tire patch and centered both radially and diagonally with respect to a bonding face of the tire patch.

11. A tire pressure sensing system, comprising:
a tire patch having a first face and an oppositely directed second face;
a plate fixed to the second face and oriented perpendicular with respect to a longitudinal axis of the tire patch;
a sensor mount positioned on the first face of the tire patch oppositely facing with respect to the plate, the sensor mount including opposed first and second bias clip members;
at least one plate fastener extending through the tire patch and fixing the plate to the second face and the sensor mount to the first face;
a tire pressure sensor releasably retained by the first and second bias clip members to the sensor mount; and
the tire patch fixed to an inner tread wall of a tire having the longitudinal axis of the tire patch coaxially aligned with a radial centerline of the tire.

12. The tire pressure sensing system of claim 11, wherein the tire pressure sensor includes a first engagement end having an aperture for receiving a first fastener, and a second engagement end having an aperture for receiving a second fastener.

13. The tire pressure sensing system of claim 12, wherein the sensor mount includes a first gap centrally disposed in the first bias clip member having a width selected to permit contact between the first bias clip member with the first engagement end of the tire pressure sensor when the first fastener is received through the first gap.

14. The tire pressure sensing system of claim 13, wherein the sensor mount includes a second gap centrally disposed in the second bias clip member having a width selected to permit contact between the second bias clip member with the second engagement end of the tire pressure sensor when the second fastener is received through the second gap.

15. The tire pressure sensing system of claim 12, wherein the tire pressure sensor includes a first end wall extending past a raised height of the first engagement end, and a second end wall defining a mirror image configuration of the first end wall extending past a raised height of the second engagement end, the first and second end walls when in contact with an edge of the sensor mount prevent further sliding motion of the tire pressure sensor into the sensor mount.

16. The tire pressure sensing system of claim 12, wherein the first and second bias clip members are formed to create first and second partial cavities sized to slidably receive the first and second engagement ends when the tire pressure sensor is coupled with the sensor mount by a lateral sliding motion of the tire pressure sensor.

17. A tire pressure sensing system, comprising:
a tire patch having opposed first and second faces and including:
a first layer of an elastically flexible material and including the second face; and
a second layer of an adhesive applied to the first layer and creating the first face;
a plate fixed to the first face and oriented perpendicular with respect to a longitudinal axis of the tire patch;
a sensor mount including opposed first and second bias clip members;
first and second plate fasteners extending through the tire patch fastening the plate and the sensor mount to the tire patch;
a tire pressure sensor slidably received in the sensor mount and releasably retained by the first and second bias clip members to the sensor mount; and
the first face fixed to an inner tread wall of a tire having the longitudinal axis of the tire patch coaxially aligned with a radial centerline of the tire.

18. The tire pressure sensing system of claim 17, wherein a body portion of the sensor mount is placed in direct contact with the second face of the tire patch.

19. The tire pressure sensing system of claim 17, wherein the first and second fasteners extend through coaxially aligned apertures created in both the plate and the body portion and act to pull the plate toward the second face and the sensor mount toward the first face.

20. The tire pressure sensing system of claim 17, wherein the tire pressure sensor includes first and second end walls, the first and second end walls when in contact with an edge of the sensor mount defining a fully engaged position of the tire pressure sensor in the sensor mount.

* * * * *